United States Patent

[11] 3,629,485

[72] Inventors Hikoitsu Watanabe
No. 5-13, 1-chome, Ehara-cho;
Sanji Genma, No. 4-8, 1-chome, Ehara-cho, both of Nakano-ku, Tokyo, Japan
[21] Appl. No. 16,079
[22] Filed Mar. 3, 1970
[45] Patented Dec. 21, 1971
[32] Priority Apr. 8, 1969
[33] Japan
[31] 44/26588

[54] DRIVEN COILED GROUND
6 Claims, 12 Drawing Figs.

[52] U.S. Cl. .................................................. 174/7
[51] Int. Cl. .................................................. H01r 3/06
[50] Field of Search .................................................. 174/6, 7

[56] References Cited
UNITED STATES PATENTS
642,169    1/1900    Stokes .......................... 174/7
3,060,257  10/1962   Spurgeon ...................... 174/7

FOREIGN PATENTS
50,561     2/1966    Poland .......................... 174/7

*Primary Examiner*—Laramie E. Askin
*Attorney*—Saul Jecies

ABSTRACT: An electrically conductive strip-shaped metallic member or wire is wound into a coiled ground main body having an engaging member fixed to the outer end thereof so that the axis of the engaging member may be aligned with the direction in which the coiled main body is uncoiled. The engaging member is engaged with a ground driving rod so that when the driving rod is driven into the soil, the coiled ground main body is gradually uncoiled and driven straightly into the soil to a desired depth. Thereafter, the driving rod is pulled out of the soil, but the ground main body remains extended straight in intimate contact with the surrounding earth. The coiled ground may be fabricated in a simple manner; the ground driving operation is much facilitated; and the intimate contact of the driven ground with the surrounding earth may be ensured.

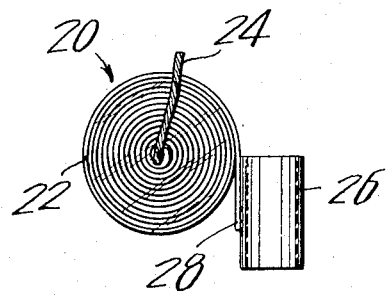
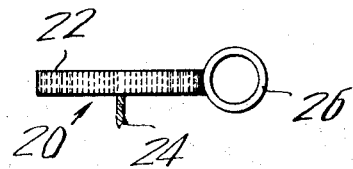
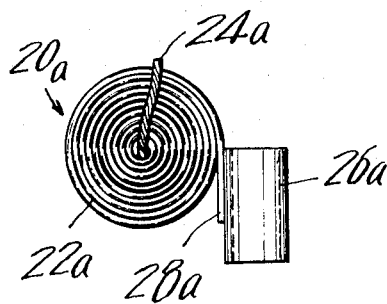
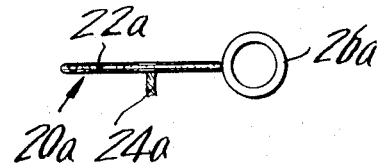
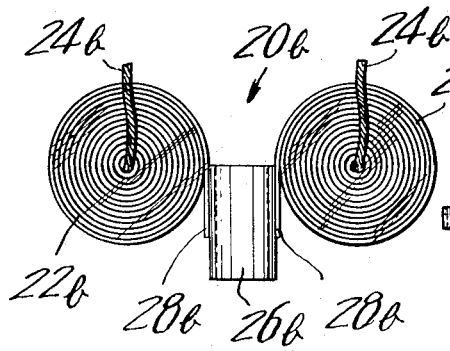
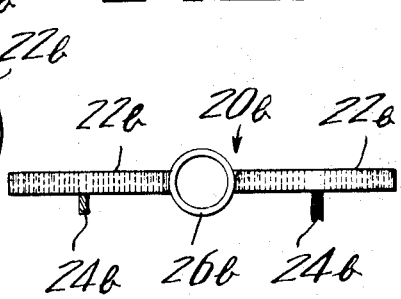

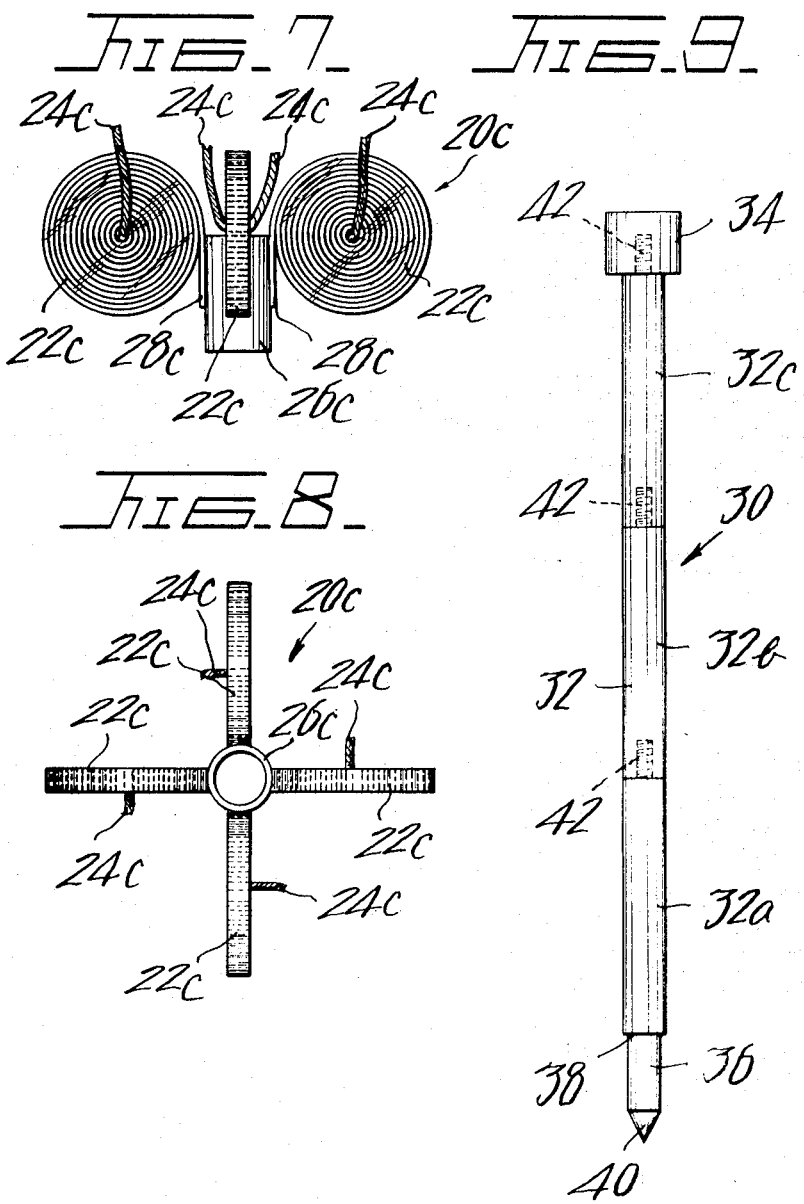

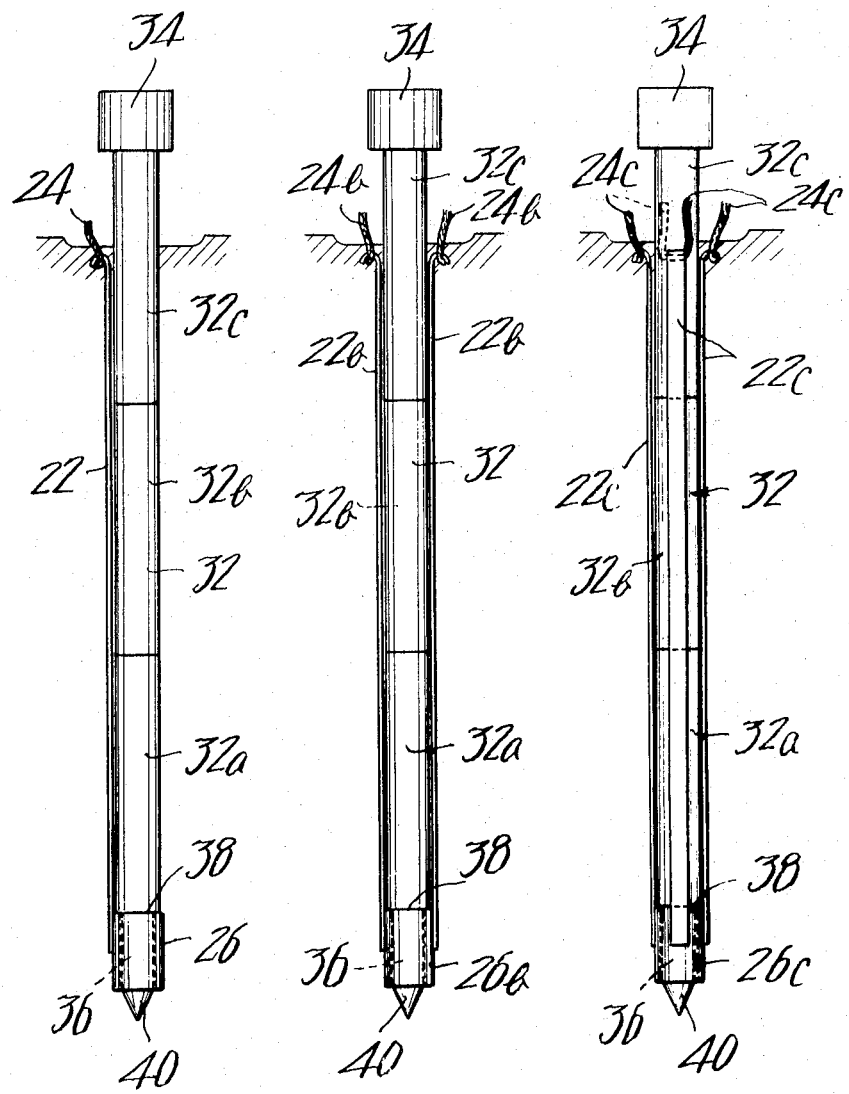

3,629,485

DRIVEN COILED GROUND

BACKGROUND OF THE INVENTION

The present invention relates to a driven ground or earth best suited for safeguarding various electrical machinery and equipment and for preventing the corrosion of underground steel pipes and the like.

CROSS-REFERENCE TO THE RELATED APPLICATION

The present invention is an improvement of a conical helical driven ground disclosed in the application Ser. No. 816,341, filed on Apr. 15, 1969 (now Pat. No. 3,548,069) by the same applicant, to be referred to as "the mother invention" hereinafter.

The mother invention relates to a conical helical ground in which a length of electrically conductive strip-shaped member or wire is wound into a conical helical form or coiled, thereby forming a ground main body. An engaging member is fixed to the inner end of the conical helical ground or coiled ground. The leading end of the driving rod is connected to the engaging member so that when the driving rod is driven into the soil, the conical helical or coiled ground main body is gradually extended and driven into the soil. After the ground has been set at a desired depth, the driving rod is pulled out of the soil. The ground remains in the soil in the form of conical helical form.

When the ground of the mother invention is driven into the soil, the main body is gradually extended in the axial direction thereof while retaining its conical helical form, so that the ground main body is twisted. Thus, the impact applied to the driving rod for driving it into the soil is resolved into the force for extending the ground into a conical helical form while twisting the ground main body and the force for driving the ground into the soil. Therefore it is seen that a considerable force is required in the driving operation. Furthermore, the deeper the ground is driven, the more force is required for extending the ground while retaining its conical helical form, so that the diameter of each coil is gradually reduced and the ground may be firmly wound around the driving rod. Thus, it is very difficult to pull out the driving rod after the ground has been driven to a desired depth. Moreover, there is a defect that the inductance may be induced because the ground is set in the conical helical form so that in some cases the desired grounding system is not attained.

SUMMARY OF THE INVENTION

In view of the above the primary object of the present invention is to provide an improved driven ground which can eliminate the defects described hereinabove.

To this end, a length of electrically conductive strip-shaped metallic member or wire is wound into a coil, thereby forming the coiled ground main body and a cylindrical engaging member is fixed to the outer end of the coiled ground main body in such a manner that the axis of the cylindrical engaging member may be aligned with the direction in which the coiled ground main body is uncoiled. The ground is driven into the soil by the driving rod which is connected to the engaging member so that the coiled ground main body is gradually uncoiled straight from the outer end thereof and extended in the soil. Therefore, the ground is not subjected to the torsion when driven into the soil and is not wound around the driving rod, so that the less force is required to drive the ground and the driving operation can be carried out very effectively. The driving rod may be easily pulled out of the soil and the ground remains extended straight in the soil so that there will be induced no inductance.

The above and other objects, features and advantages of the present invention will become more apparent from the following description of some illustrative embodiments thereof taken in conjunction with the accompanying drawing.

BRIEF DESCRIPTION OF THE DRAWING

FIG. 1 is a front view of a first embodiment of the present invention;

2 is a top view thereof;

FIG. 3 is a front view of a second embodiment of the present invention;

FIG. 4 is a top view thereof;

FIG. 5 is a front view of a third embodiment of the present invention having two coiled ground main bodies;

FIG. 6 is a top view thereof;

FIG. 7 is a front view of a fourth embodiment of the present invention having four coiled ground main bodies;

FIG. 8 is a top view thereof;

FIG. 9 is a front view of the example of a driving rod; and

FIGS. 10, 11 and 12 are views illustrating driven grounds respectively.

DESCRIPTION OF THE PREFERRED EMBODIMENTS

In FIGS. 1 and 2, the first embodiment of driven coiled ground 20 is illustrated. The coiled ground 20 comprises a ground main body 22 consisting of a length of strip-shaped member which is wound into a coil, a lead wire 24 fixed to the inner end of the main body 22 and an engaging member 26 fixed to the outer end of the main body 22.

The main body 22 is made of a length of strip-shaped electrically good conductive metallic material having a suitable thickness and width. The metallic member is coiled as shown and has an uncoiled portion 28 formed at the outer end. The lead wire 24 is fixed by a suitable manner such as brazing to the inner end of the main body 22 in order to flow the current thereto. The engaging member 26 is in the form of a cylinder and fixed by a suitable manner such as brazing to the outer end of the uncoiled portion 28 the main body 22 in such a manner that the axis of the cylindrical engaging member 26 may be aligned with the direction of uncoiling of the ground main body 22. Preferably the engaging member 26 is made of an electrically conductive material having as highest conductivity as possible.

The second embodiment shown in FIGS. 3 and 4 is different from the first embodiment shown in FIGS. 1 and 2 in that the ground main body 22a is made of an electrically conductive wire which is coiled as shown. As in the case of the first embodiment, the lead wire 24a is fixed to the inner end of the main body 22a while the engaging member 26a is fixed to the outer end of the uncoiled portion 28a of the main body 22a in such a manner that the axis of the engaging member 26a may be aligned with the direction of uncoiling of the main body 22a.

In the third embodiment 20b illustrated in FIGS. 5 and 6 and the fourth embodiment 20c illustrated in FIGS. 7 and 8, the main bodies 22b and 22c are substantially similar to those 22 or 22a in the first or second embodiment and the lead wires 24b and 24c are fixed to the inner ends of the main bodies 22b and 22c respectively in the same manner as described hereinabove. In the third embodiment illustrated in FIGS. 5 and 6, two main bodies 22b are fixed to a common engaging member 26b at both sides thereof through the uncoiled portions 28b in the same manner as described hereinabove. In the fourth embodiment illustrated in FIGS. 7 and 8, four main bodies 22c are equiangularly fixed to a common engaging member 26c through the uncoiled portions 28c in the same manner as described hereinabove.

According to the present invention, only one or a plurality of main bodies may be fixed to one engaging member as needs demand and each of the main bodies may be made of strip-shaped material or wire having as highest electrical conductivity as possible. FIG. 9 illustrates a driving rod 30 for driving the coiled grounds in accordance with the present invention into the soil. The driving rod 30 comprises rod portions 32, a driving head 34 fixed to the uppermost rod portion 32c and a smaller diameter portion 36 fixed to the lowermost rod portion 32a and adapted to be fitted into the engaging member of the coiled ground. It is noted that a shoulder or stepped portion 38 is formed between the smaller diameter portion 36 and the lowermost rod portion 32a.

The smaller diameter portion 36 has a leading portion 40 formed at the lower end in the form of an inverted cone. The rod portions 32 of the driving rod 30 may be comprised of a single rod, but it is preferable that the driving rod 30 may be comprised of a plurality of rod portions as described hereinabove and as shown in FIG. 9 when the ground must be driven into the soil at a considerable depth. That is, the rod portions 32 may be comprised of rods 32a, 32b and 32c and the smaller diameter portion 36 is fixed to the lowermost rod 32a. Each of the rods 32a, 32b and 32c may be provided with, for example, an internally threaded hole 42 at the lower end and an externally threaded projection at the upper end, so that the rods 32a, 32b and 32c may be releasably connected to each other by screwing the internally threaded hole of an upper rod over the externally threaded projection of a lower rod. In driving, the driving head 34 is first screwed to the lowermost rod 32a and after the rod 32a has been driven into the soil, the driving head 34 is unscrewed therefrom and the next rod 32b is screwed to the rod 32a and thereafter the driving head 34 is screwed again to the rod 32b. By repeating the above described operation, a desired number of rods may be driven into the soil at a desired depth.

For driving the coiled ground in accordance with the present invention, first a hole is dug to a suitable depth. At the bottom of the hole is placed the coiled ground and the smaller diameter portion 36 of the driving rod 30 is fitted into the engaging member 26—26c. The impact is applied to the driving head 34 so that the rod 30 may be driven into the soil. In this case, the shoulder or stepped portion 38 of the driving rod 30 is firmly pressed against the upper end of the engaging member 26—26c so that when the driving rod 30 is driven into the soil, the main body 22—22c is gradually uncoiled and driven into the soil straightly. When the coiled grounds 20—20c are driven into the soil at desired depths as shown in FIGS. 10, 11 and 12, the driving rod 30 is pulled out of the soil so that the main body 22—22c may remain extended straightly at a desired depth in intimate contact with the soil. When four or more than four coiled grounds are driven as shown in FIG. 12, the driven main bodies 22c form the sides of a regular prism.

Therefore, the aqueous solution of an earth treating agent may be poured into the hole left after driving rod is pulled out of the soil, thereby treating the earth surrounding the ground main bodies 22c so as to reduce the ground resistance.

The present invention has been so far described in particular reference to the illustrative embodiments thereof, but it will be understood that variations and modifications can be effected without departing from the true spirit of the present invention as described hereinabove and as defined in the appended claims.

What is claimed is:

1. An electrical grounding apparatus comprising, in combination, a coiled electrically conductive elongated member with one end of said coiled member at the axial center of the coil and the other end of said coiled member on the periphery of the coil;

a tubular member secured to said other end of said coiled member on the periphery of said coil, the axis of said tubular member being substantially along the direction of unwinding of said coil; and said tubular member being adapted to receive a retrievable driving rod having a driving point passing freely through the interior of said tubular member, said driving point including a shoulder for contacting an axial end of said tubular member for driving the latter into the ground.

2. The apparatus as defined in claim s including a lead wire connected to said one end of said coil member at the axial center of the coil.

3. The apparatus as defined in claim 1 including further coiled electrically conductive elongated members secured to said tubular member.

4. The apparatus as defined in claim 1 wherein said coiled member comprises a strip-shaped member.

5. The apparatus as defined in claim 1 wherein said coiled member comprises a wire-shaped member.

6. The apparatus as defined in claim 1 wherein the coiled turns of said coils are located substantially within the same plane.

* * * * *